US012782753B2

(12) United States Patent
Kofoed et al.

(10) Patent No.: US 12,782,753 B2
(45) Date of Patent: Nov. 3, 2026

(54) FRICTION HINGE

(71) Applicant: LINDBERG A/S, Åbyhøj (DK)

(72) Inventors: Jeppe Birch Kofoed, Trige (DK); Henrik Lindberg, Risskov (DK); Lars Bøjvad, Højbjerg (DK); Thomas Mach, Skødstrup (DK); Hans Boye-Nielsen, Hinnerup (DK)

(73) Assignee: LINDBERG A/S, Åbyhøj (DK)

( * ) Notice: Subject to any disclaimer, the term of this patent is extended or adjusted under 35 U.S.C. 154(b) by 461 days.

(21) Appl. No.: 17/801,388

(22) PCT Filed: Feb. 26, 2021

(86) PCT No.: PCT/DK2021/050057
§ 371 (c)(1),
(2) Date: Aug. 22, 2022

(87) PCT Pub. No.: WO2021/170195
PCT Pub. Date: Sep. 2, 2021

(65) Prior Publication Data

US 2023/0096733 A1 Mar. 30, 2023

(30) Foreign Application Priority Data

Feb. 26, 2020 (DK) .......................... PA 2020 70123

(51) Int. Cl.
*G02C 5/22* (2006.01)

(52) U.S. Cl.
CPC .................................... *G02C 5/22* (2013.01)

(58) Field of Classification Search
CPC .. G02C 5/22; G02C 2200/06; G02C 2200/20; G02C 5/2209
See application file for complete search history.

(56) References Cited

U.S. PATENT DOCUMENTS 2,828,668 A 4/1958 Armand
3,042,961 A 7/1962 Tieri
(Continued)

FOREIGN PATENT DOCUMENTS

CN 206320171 U * 7/2017
CN 107077004 A 8/2017
(Continued)

OTHER PUBLICATIONS

Gerard, FR 2808598 A1 Espacenet Machine Translation, Nov. 9, 2001 (Year: 2001).*
(Continued)

*Primary Examiner* — Bumsuk Won
*Assistant Examiner* — Ray Alexander Dean
(74) *Attorney, Agent, or Firm* — Schmeiser Olsen PLLC

(57) ABSTRACT

A hinge is provided for pivotally connecting a temple bar and the rims of eyeglass frame including: a first part with an upper flange where a first aperture provides a tight fit for a locking pin head section, and a lower flange provided with a recess for receiving the locking pin cylindrical body, a second part with a second aperture having a higher surface roughness than the locking pin cylindrical body, thereby having a higher surface friction between the bushing and the aperture than between bushing and the locking pin a bushing with an inner opening, a locking pin having a head section and a cylindrical body The second part arranged with a bushing is inserted between the upper flange and the lower flange of the first part. The locking pin is inserted through the first aperture through the inner opening of the bushing and received in the recess.

7 Claims, 2 Drawing Sheets

(56) References Cited

U.S. PATENT DOCUMENTS

| | | | | | |
|---|---|---|---|---|---|
| 4,256,388 | A | * | 3/1981 | Beyer | F16B 35/00 16/385 |
| 4,428,094 | A | * | 1/1984 | Emain | G02C 5/2281 16/342 |
| 4,978,209 | A | * | 12/1990 | Ohba | G02C 5/2209 351/113 |

FOREIGN PATENT DOCUMENTS

| | | | | | |
|---|---|---|---|---|---|
| DE | 1117911 | B | | 11/1961 | |
| DE | 3002193 | A1 | | 7/1981 | |
| EP | 0111621 | B1 | * | 6/1986 | |
| EP | 0489380 | A1 | | 6/1992 | |
| EP | 3213143 | B1 | | 8/2018 | |
| FR | 2404241 | A2 | | 4/1979 | |
| FR | 2607270 | A1 | | 5/1988 | |
| FR | 2808598 | A1 | * | 11/2001 | G02C 5/2281 |
| FR | 3094801 | A1 | | 10/2020 | |
| JP | 1999024007 | A | | 1/1999 | |
| JP | 2017533470 | A | | 11/2017 | |
| WO | WO-2011132936 | A2 | * | 10/2011 | G02C 1/06 |
| WO | 2013179343 | A1 | | 5/2013 | |
| WO | 2016/066583 | A1 | | 5/2016 | |

OTHER PUBLICATIONS

International Search Report for PCT/DK2021/050057 mailed May 4, 2021.

Written Opinion for PCT/DK2021/050057 mailed May 4, 2021.

* cited by examiner

FRICTION HINGE

CROSS-REFERENCE TO RELATED APPLICATIONS

This application claims priority to PCT Application No. PCT/DK2021/050057, having a filing date of Feb. 26, 2021, which is based DK Application No. PA 2020 70123, having a filing date of Feb. 26, 2020, the entire contents both of which are hereby incorporated by reference.

FIELD OF TECHNOLOGY

The following is directed to a hinge for pivotally connecting a temple bar and the rims in an eyeglass frame as well as a pair of eye-glasses incorporating such a hinge.

BACKGROUND

It shall be understood that eyeglasses within embodiments of the invention shall be understood as eyeglasses with a rim surrounding the entire periphery of the lenses, half-rims surrounding only part of the periphery of the lenses, and rim-less eyeglasses, where the temple bars are attached directly to the lenses without a rim.

More precisely embodiments of the invention relate to a hinge for pivotally connecting two parts, for example a temple bar and the rims in an eyeglass frame or two sections of a temple bar, where the hinge comprises:

in a distal end of a first part is provided an upper flange and a lower flange, where the flanges are spaced apart by the distance x, and where a first aperture is provided in the upper flange, the aperture having a diameter y;

in a distal end of a second part a through-going second aperture is provided, the through-going aperture defining an inner cylindrical wall, where the second aperture has a diameter z, and where the distance k between an upper surface and a lower surface of the second part is smaller than the distance x between the flanges;

a bushing made from a resilient material is arranged in the through-going second aperture, the bushing having an axis of symmetry, and where the extent of the bushing along the axis of symmetry is equal to or larger than the distance k between an upper surface and a lower surface of the second part but smaller than the distance x between the flanges, the bushing having an inner opening with a diameter l perpendicular to the axis of symmetry;

a locking pin, the locking pin having a head section and a cylindrical body section defining an axis of symmetry, where the head section in a cross section perpendicular to the axis of symmetry has a dimension such that the head section may be accommodated in the first aperture, and where the extend of the body section along the axis of symmetry is equal to or larger than the distance x between the flanges, and where the diameter n of the body section perpendicular to the axis of symmetry is equal to or larger than the diameter l of the inner opening of the bushing;

such that by inserting the bushing in the aperture in the distal end of the second part, and inserting the distal end of the second part in between the upper surface and the lower surface in the distal end of the first part, the first aperture in the upper flange will be superposed the inner opening of the bushing, whereby the locking pin's body section may be inserted inside the inner opening of the bushing, and thereby pivotably connect the two parts In the art it is well-known to provide hinge constructions between the temple bars and the rims of the glasses where such hinges have a variety of different characteristics depending on the particular eyeglass frame which is desirable to manufacture.

One of the desirable aspects of a hinge is the ability of the hinge to maintain the temple bar in a substantially fixed position with respect to the rims of the eyeglasses where "substantially fixed position" in this connection shall be understood such that in order to pivot the temple bars relative to the rims, requires a slight amount of force, however, the temple bars are not able to pivot by themselves. The necessary force shall not deform or otherwise have detrimental influence on any part of the eyeglass frames.

For this purpose, a number of various designs have been contemplated, but in all of these designs the hinge construction depends on relatively complex constructions involving springs or pure friction obtained by tightening the screw connecting the temple bar to the rim sufficiently in order to create the desired friction thereby retaining the temple bar in a substantially fixed position relative to the rims.

Common for these conventional art solutions are that they are rather complicated or that they need to be readjusted after some time due to wear and tear whereby the connection between the temple bar and the rim becomes loose and does not fulfil the desired purpose.

A hinge of the type described by way of introduction is known from U.S. Pat. No. 4,428,094. In this hinge a rotation may occur between the bushing and the second aperture or between the bushing and the locking pin. Accordingly, it is not clear whether rotation will occur in relation to another element. The mutual rotation may therefore take place in such way that the bushing may rotation in relation both to the pin and the aperture, hereby. this is a drawback as there is no control of the forces to be used for establishing the rotation. Moreover, wear of the hinge parts may not be controlled as it is unsecure which elements there are moving in relation to another element. Furthermore, is no teaching of how to maintain same friction between the hingedly connected members over a very long period.

SUMMARY

An aspect relates to a hinge construction which is able to reliably retain the temple bars in a substantially fixed position relative to the rims and at the same time is relatively small, compact and unobtrusive and furthermore created in a simple manner. Furthermore, it is an object to maintain the same friction between the hingedly connected members over a very long period of time.

Embodiments of the invention address this by providing a hinge as described by way of introduction and which hinge is peculiar in that the surface roughness of the wall of the second aperture has a larger roughness value Ra than the roughness value Ra of the locking pin thereby having a higher friction between the bushing and the wall of the second aperture than between the inner opening in the bushing and the locking pin.

In an embodiment, the relatively tight fit between the bushing and the aperture into which it is positioned as well as the tight fit between the locking pin and the bushing provides a substantial friction in order for the temple bar to be able to remain in a substantially fixed position with respect to the rim, i.e. in a position where it requires some manipulation in order to pivot the temple bar relative to the rim due to the friction created in the hinge. In this manner the friction between the hingedly connected members is retained for a very long time. The fact that an elastic/resilient material is retained under compression inside the hinge construction will provide and maintain the desired friction, even after wear, as the resilient material will urge against the surfaces thereby maintaining the desired friction.

At the same time the construction is relatively simple in that the locking pin is retained partly by the bushing and partly by the aperture provided in the upper flange in the distal end of the first part.

By differentiating the roughness values and thereby differentiating the friction between the bushing and the second aperture and the friction between the bushing and the locking pin it is possible to control which parts will move relative to which parts during the pivotable movement of the hinge. The roughness value Ra is an indication of the surface friction between two parts and as such by having a higher friction between two parts than between two other parts it is clear that the parts with the lowest friction, i.e., the lowest roughness values, will move relative to each other before the higher roughness (higher friction) will begin to move.

In this way it is possible as suggested in this embodiment to create movement during pivoting of the hinge mechanism between the locking pin and the bushing. Hereby it is possible to control the friction over a long time by suitable selection of the material and the properties of the material and the elements used for the hinge elements.

It shall be understood that eyeglasses at least within the present application shall be understood as eyeglasses with a rim surrounding the entire periphery of the lenses, half-rims surrounding only part of the periphery of the lenses, and rim-less glasses, where the temple bars are attached directly to the lenses without a rim.

In an embodiment of the invention, the friction is further increased in that the diameter n of the body section of the locking pin perpendicular to the axis of symmetry is larger than the diameter l of the inner opening of the bushing, and where the bushing may be deformed, such that excessive material is squeezed into the space created by the differences in length between the distance x between the flanges and the distance k between the upper surface and the lower surface of the second part.

In this manner the insertion of the cylindrical body section of the locking pin into the bushing will deform the bushing which is held firmly in place by the aperture in the second part such that the bushing material will be squeezed out of the aperture in the second part thereby forming a further resilient bearing between the first and second parts. Furthermore, the deformation will increase the frictional engagement between the locking pin, the bushing and the second part.

In an embodiment of the invention, the lower flange is provided with a depression, suitable to accommodate the distal end of the locking pin, the depression being formed on the side of the lower flange facing the upper flange.

In this manner a guidance and steering for the distal end of the locking pin is created in the lower flange of the first part such that as the locking pin is inserted through the aperture provided in the upper flange of the first part and passed through the aperture in the second part the distal end of the locking pin will be retained in the recess created in the lower flange. At the same time the head section of the locking pin will be retained in the aperture provided in the upper flange. Thereby the two parts of the hinge are pivotally locked together by the locking pin in a stable and secure manner.

In an embodiment of the invention, the outer diameter of the bushing $l_2$ perpendicular to the axis of symmetry when not arranged in the second aperture, is larger than the diameter z of the second aperture.

By providing a bushing having a larger diameter than the aperture into which it is to be fitted the bushing needs to be deformed during mounting in the aperture. During mounting/installation of the bushing a part of the excess material will be able to extend along both rims of the aperture and at the same time the inner diameter of the bushing due to the squeezing of the bushing when being arranged in the aperture is smaller than the original bushing not inserted.

Furthermore, when the locking pin is inserted into the bushing the locking pin will also deform the bushing such that further excess material is squeezed out of the aperture such that the excess bushing material will provide a resilient bearing between the first and second parts. By correctly dimensioning the dimensions of the bushing and at the same time selecting the proper material properties it is possible to provide a deformation of the resilient material of the bushing such that the yield stress of the material is achieved whereby a substantially homogenous deformation of the bushing will occur whereby the bearing will be evenly distributed in the space between the distal end of the first part and the distal end of the second part.

In an embodiment of the invention, the head section of the locking pin is press-fitted into the first aperture provided in the upper flange.

By press-fitting the locking pin's head into the aperture in the upper flange of the first part the locking pin is fixed with respect to the aperture such that the locking pin cannot rotate in the aperture and at the same time the locking pin is safely retained in the hinge construction ensuring that the integrity of the hinge is maintained during use.

Furthermore, due to the provision of the bushing and in some embodiments the design of the relative friction between the different parts it is possible to design the frictional engagement between the pivoting parts such that the locking pin will not be forced to rotate relative to the first part. Consequently, a very stable and secure connection is created in the hinge between the locking pin provided in the first part and the aperture provided in the second part.

In a still further advantageous embodiment, the first and second parts are made from titanium and where the bushing is made from a polymer material with a shore A hardness of 50 or more, or 60 or more. With this selection of materials, it is possible to create a very light construction which at the same time has superior strength characteristics due to the inherent strength characteristics of titanium. Furthermore, by selecting the bushing from a polymer material having the desired shore A hardness of 50 or more the wear and tear in the hinge joint will be negligible thereby ensuring a long, stable service life for such a hinge construction.

Among the many polymers which are suitable for embodiments of the present invention, are the polymer materials of the polyamide type, particularly PA6 or PA11.

Embodiments of the invention are also directed to eyeglass frames made from a resilient metal material, the frames comprising rims suitable to receive lenses, and two temple bars arranged on either side of the rims, where the temple bars are connected to the rims by two hinges.

It is clear that eyeglass frames made with a hinge construction as already described above will obtain and enjoy the same advantages as mentioned with respect to the hinge construction.

BRIEF DESCRIPTION

Some of the embodiments will be described in detail, with references to the following Figures, wherein like designations denote like members, wherein.

DETAILED DESCRIPTION

Figure 1:
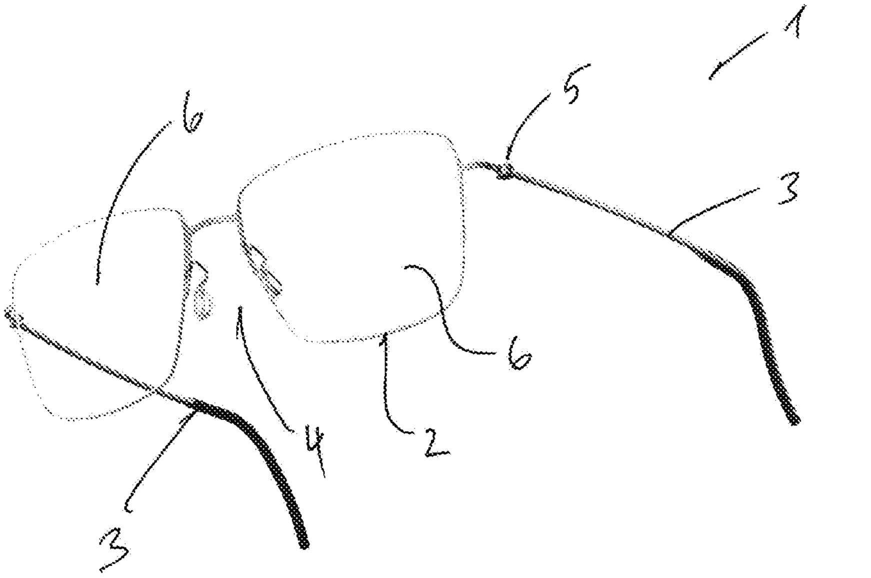
FIG. 1 illustrates an example of frames for eyeglasses with a full rim.

In FIG. 1 is illustrated an example of frames for eyeglasses 1. The frames typically comprise a pair of rims 2 in which rims means are provided for holding correctional lenses 6. From the rims 2 usually extend two temple bars 3 such that the eyeglasses 1 may be borne by a user by arranging the temple bars, for example over the ears, and arranging a nose bar 4 on the nose. It is well-known to provide a hinge 5 between the temple bars 3 and rims 2 such that the temple bars may be pivoted into a position where the longitudinal extent of the temple bar 3 is substantially parallel to the plane of the rims 2. This is typically done for storage.

Figure 2:
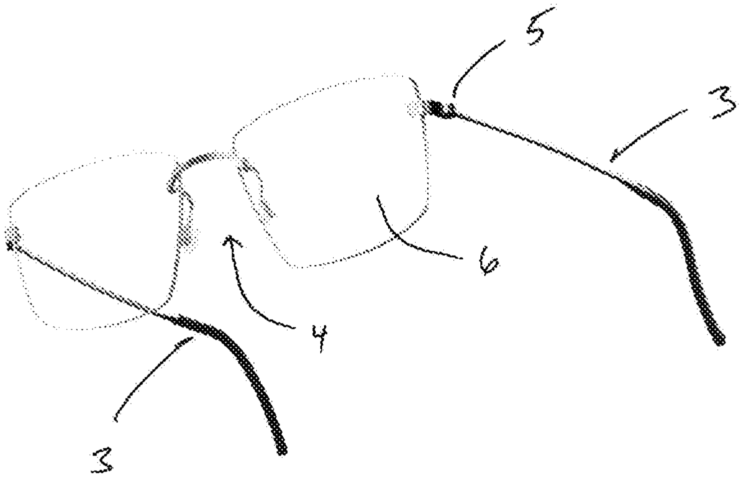
FIG. 2 illustrates an example of rim-less eye-glasses.

In FIG. 2 is illustrated an example of a pair of eyeglasses of the rimless type, where the temple bars 3 are mounted directly on/in the lenses 6.

It is, however, desirable that the hinge construction 5 retains the temple bars 3 in a substantially fixed position with respect to the rims 2 in order to provide comfort for the wearer. In some instances, the relative distance between the temple bars 3 may be such that the temple bars squeeze onto the side of the head of the user in order to retain the eyeglasses relatively fixed relative to the wearer.

Embodiments of the present invention are directed to providing a hinge construction 5 which is novel and inventive and does comprise a number of advantageous technical features. Furthermore, a pair of eyeglasses incorporating such hinges will also be included in embodiments of the invention.

Figure 3:
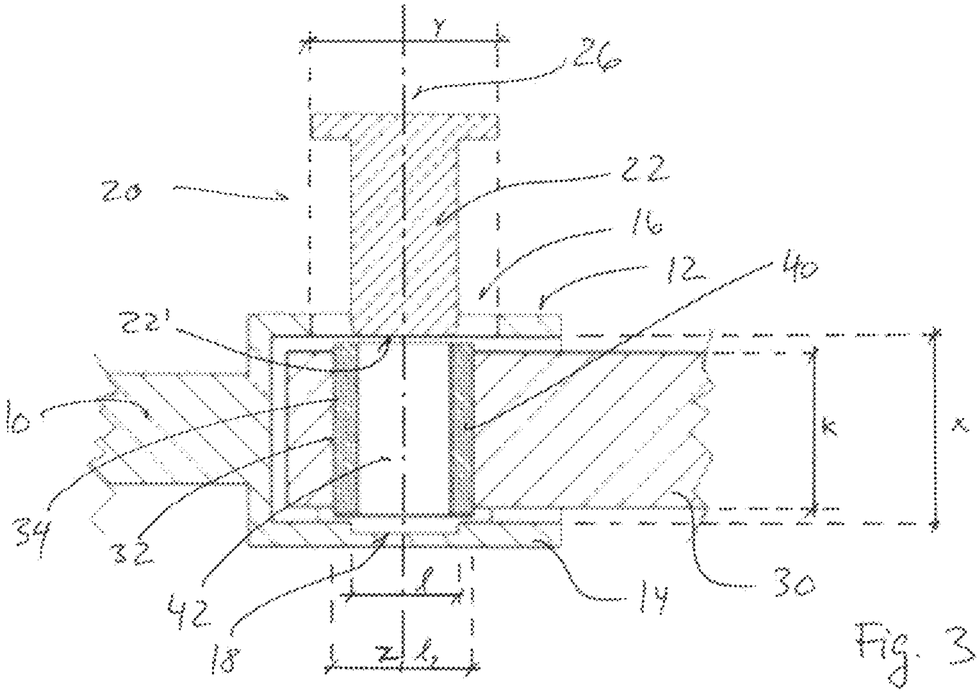
FIG. 3 illustrates the hinge construction before the locking pin is inserted.
Figure 4:
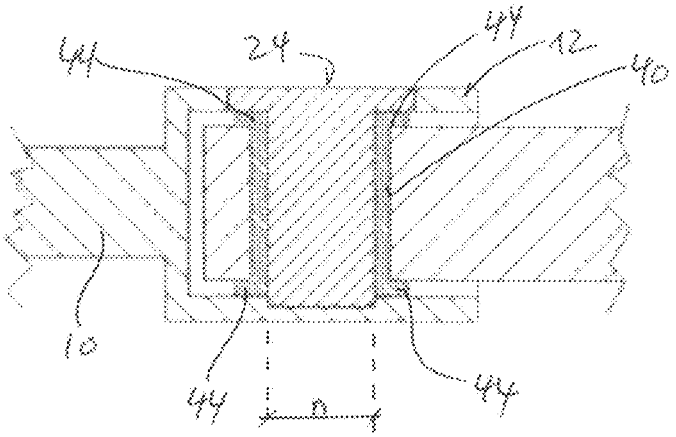
FIG. 4 illustrates the hinge construction after the locking pin is received in the recess.

The main principle of embodiments of the invention will be explained with reference to FIGS. 3 and 4 illustrating cross-sections through a hinge construction before and after insertion of a locking pin.

In FIG. 3 the hinge construction comprises a first part 10, for example being a temple bar. The first part is in a distal end provided with an upper flange 12 and a lower flange 14. The distance between the flanges is x. In the upper flange 12 is provided a first aperture 16 where this aperture has a diameter y. In the lower flange 14 is provided a recess 18. When inserting the locking pin 20 through the first aperture 16 the body section 22 of the locking pin and in particular the distal end 22' of the body section of the locking pin will be received in the recess 18 as illustrated with reference to FIG. 4.

The locking pin 20 furthermore comprises a head section 24. The head section 24 has a dimension perpendicular to the axis of symmetry 26 such that a snug and tight fit may be created between the head section 24 of the locking pin 20 and the aperture 16 provided in the upper flange when the locking pin is inserted into a locked position as illustrated with reference to FIG. 4. The extent of the body section 22 is such that when the head section 24 is in its proper snug and tight-fit position in the aperture 16 the distal end 22' of the body section 22 of the locking pin 20 will engage the recess 18 provided in the lower flange 14.

The other part of the hinge comprises a second part 30. In a distal end of the second part is provided a second aperture 32. The second aperture 32 is a through-going aperture such that the aperture defines an inner cylindrical wall 34. The second aperture has a diameter z. Furthermore, the thickness k of the second part, i.e., the distance between the upper and lower side of the second part is k where k is smaller than the distance x between the upper and lower flanges 12, 14 of the first part. In this manner it is possible to insert the second part 30 between the flanges 12, 14 of the first part 10 with some play.

In the second aperture in the second part 30 is arranged a bushing 40. In this embodiment the bushing has an extent along the axis of symmetry 26 which is larger than the thickness of the second part 30 but smaller than the distance x between the upper and lower flange 12, 14 of the first part 10.

Figure 5:
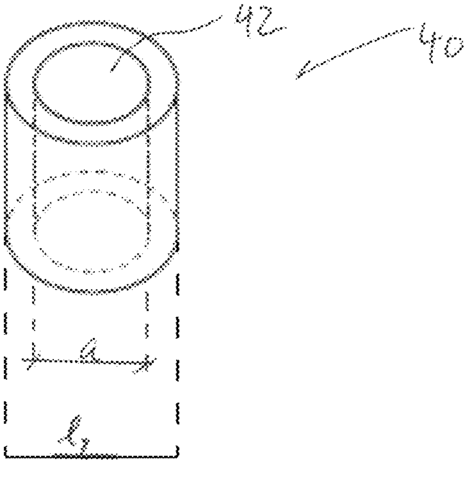
FIG. 5 illustrates the bushing.

Furthermore, the bushing 40 as illustrated in FIG. 5 has an inner opening 42 with a diameter perpendicular to the axis of symmetry of a.

Continuing on to FIG. 4 the locking pin 20 has been inserted through the first aperture 16 such that the body section 22 of the locking pin 20 is fitted inside the opening 42 in the bushing 40. Furthermore, the distal end 22' of the body section 22 of the locking pin 20 is accommodated in the recess 18 in the lower flange 14. During the insertion of the locking pin 20 the bushing 40 has been deformed such that extra bushing material has been forced into the space between the first part and the second part. This extra bushing material 44 creates a bearing between the first and second parts 10, 30 such that a stable, firm and resilient connection is created between the two parts 10, 30. It is to be understood that the surplus bushing material will be retained in the immediate vicinity of the locking pin, and that the deformation will not cause the bushing material to disintegrate. This may be controlled by applying the forces from the locking pin slowly and/or carefully heating the bushing material and/or selecting the bushing material such that any deformation does not cause disintegration or failure.

In order for the bushing to be able to deform as illustrated in FIG. 4 the bushing may be made from a resilient polymer material such as for example a polyamide. Particularly, PA6 is well-known for its hardness, strength, ductility, wearability and resistance to chemicals such that the PA6 is more or less considered as a universal polymer material for these kinds of bearings. Also, a further derived polyamide PA11 may be used where the PA11 has a higher hardness and ductility and as such may be more difficult to deform as illustrated in FIG. 4, but nevertheless provides excellent wear characteristics providing a long service life.

Furthermore, the polymer should be selected with a shore A hardness (according to ASTMD2240 and ASTMD1414) in the range of 50 to 60 in order to provide sufficient resiliency to be deformed by inserting the locking pin 20 through the bushing and at the same time provide sufficient wear resistance and strength in order to create a stable and reliable hinge construction.

Although the various dimensions ensure that sufficient friction is established between the pivoting parts the surface roughness particularly of the inner wall of the second aperture may be chosen to be higher than the surface roughness between the bushing and the locking pin body section 22. By selecting the surface roughness value (Ra) to be higher between the bushing and the second part than between the body section 22 of the locking pin 20 and the inner opening of the bushing the hinge is designed such that pivotable movement will occur between the body section 22 of the locking pin and the inner opening in the bushing. For the sake of completeness, the roughness parameters are established according to BS EN ISO4287:2000 (British standard) which corresponds to ISO4287:1997 (European standard). The parameter Ra is the arithmetic average of roughness profile.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A hinge for pivotally connecting a temple bar and the rims in an eyeglass frame or two sections of a temple bar, where the hinge comprises:

in a distal end of a first part is provided an upper flange and a lower flange, where the flanges are spaced apart by the distance (x), where a first aperture is provided in the upper flange, the aperture having a diameter (y), and wherein a depression is formed on a side of the lower flange facing the upper flange, wherein the depression is located on an interior bottom surface of the lower flange and does not extend through a thickness of the lower flange;

in a distal end of a second part a through-going second aperture is provided, the through-going aperture defining an inner cylindrical wall, where the second aperture has a diameter (z), and where the distance (k) between an upper surface and a lower surface of the second part is smaller than the distance (x) between the flanges;

a bushing made from a polymer material is arranged in the through-going second aperture where the polymer material is retained under compression and urges against the inner cylindrical wall of the through-going second aperture, the bushing having an axis of symmetry, and where the extent of the bushing along the axis of symmetry is larger than the distance (k) between an upper surface and a lower surface of the second part but smaller than the distance (x) between the flanges such that excessive bushing material extends beyond the upper surface and the lower surface of the second part, the bushing having an inner opening with a diameter (1) perpendicular to the axis of symmetry;

a locking pin, the locking pin having a head section and a cylindrical body section defining an axis of symmetry, where the head section in a cross section perpendicular to the axis of symmetry has a dimension such that the head section may be accommodated in the first aperture, which head section has a diameter which is larger than the diameter of the cylindrical body section, and where the extend of the body section along the axis of symmetry is equal to or larger than the distance (x) between the flanges, and where the diameter (n) of the body section perpendicular to the axis of symmetry is equal to or larger than the diameter (l) of the inner opening of the bushing; such that by inserting the bushing in the second aperture in the distal end of the second part, and inserting the distal end of the second part in between the upper surface and the lower surface in the distal end of the first part, the aperture in the upper flange will be superposed the inner opening of the bushing, whereby the locking pin's body section may be inserted inside the inner opening of the bushing, and thereby pivotably connect the two parts, wherein the head section of the locking pin is press-fitted into the first aperture provided in the upper flange, thereby fixing the locking pin with respect to the first aperture such that the locking pin cannot rotate in the first aperture and cannot rotate in relation to the first part, wherein the extent of the cylindrical body section is such that when the head section of the locking pin is press-fitted into the first aperture a distal end of the cylindrical body section of the locking pin will engage the depression formed in the lower flange, wherein the distal end of the cylindrical body section of the locking pin includes a bottom surface of the locking pin, wherein the depression is configured to accommodate the distal end of the locking pin including the bottom surface of the locking pin, wherein the surface roughness of the wall of the second aperture has a larger roughness value Ra than the roughness value Ra of the locking pin thereby having a higher friction between the bushing and the wall of the second aperture than between the inner opening in the bushing and the locking pin, and wherein the diameter (n) of the body section of the locking pin perpendicular to the axis of symmetry is larger than the diameter (l) of the inner opening of the bushing, and where the bushing may be deformed, such that the excessive bushing material that extends beyond the upper surface and the lower surface of the second part is squeezed out of the second aperture and into the space created by the differences in length between the distance (x) between the flanges and the distance (k) between the upper surface and the lower surface of the second part and thereby forming a bearing between the first and second parts and increasing the frictional engagement between the locking pin, the bushing, and the second part.

2. The hinge according to claim 1, wherein the outer diameter of the bushing ($l_2$) perpendicular to the axis of symmetry when not arranged in the second aperture, is larger than the diameter (z) of the second aperture.

3. The hinge according to claim 1, wherein the first and second parts are made from titanium and where the bushing is made from a polymer material with a shore A hardness of 50 or more.

4. The hinge according to claim 1, wherein the first and second parts are made from titanium and where the bushing is made from a polymer material with a shore A hardness of 60 or more.

5. The hinge according to claim 3 or 4, wherein the polymer material is a polyamide: PA6 or PA11.

6. A rim or rimless eyeglass frames made from a metal material, the frames comprising rims suitable to receive lenses or being mounted in the lenses, and two temple bars arranged on either side of the rims, where the temple bars either are connected to the rims or lenses by two hinges according to claim 1 or where each temple bar incorporates the hinge according to claim 1.

7. The hinge according to claim 1, wherein the bushing has a uniform inner diameter along the axis of symmetry.

* * * * *